United States Patent [19]
Rockwell et al.

[11] Patent Number: 6,049,323
[45] Date of Patent: Apr. 11, 2000

[54] INFORMATION MESSAGE DISPLAY METHOD

[75] Inventors: Ronald R. Rockwell; Aida L. Rockwell, both of Lake Worth, Fla.

[73] Assignee: Motorola, Inc., Schaumburg, Ill.

[21] Appl. No.: 09/148,062

[22] Filed: Sep. 4, 1998

[51] Int. Cl.$^7$ ....................................... G09G 5/34
[52] U.S. Cl. .................. 345/123; 345/56; 340/825.44
[58] Field of Search ................................ 345/121, 123, 345/124, 56; 340/825.44, 825.27, 311.1; 455/31.2, 31.1

[56] References Cited

U.S. PATENT DOCUMENTS 3,976,995  8/1976  Sebestyen .
5,426,422  6/1995  Vanden Heuvel et al. ......... 340/825.44
5,473,667  12/1995 Neustein ................................ 455/31.2

FOREIGN PATENT DOCUMENTS 0317230  5/1989  Japan .

Primary Examiner—Regina Liang
Attorney, Agent, or Firm—James A. Lamb

[57] ABSTRACT

A method is used in a selective call receiver (SCR) (100) for displaying information messages received by the SCR on a multiline display (124) of the SCR. According to the method, a plurality of information messages is received (405), wherein each of the plurality of information messages has an identifiable source. An operator selection (415) of a paramount source is determined. An information message associated with the paramount source is automatically displayed (430) on a line of the multiline display in a horizontal scrolling manner when the information message having the paramount source is determined to have a value different than a previously displayed value of an information message from the paramount source. Information messages that are not associated with any paramount source are displayed in a full screen manner (440) when such information messages are displayed in response to manipulation of controls.

8 Claims, 3 Drawing Sheets

6,049,323

INFORMATION MESSAGE DISPLAY METHOD

FIELD OF THE INVENTION

This invention relates in general to selective call receiver operation and in particular to display of messages received by a selective call receiver.

BACKGROUND OF THE INVENTION

An information message is a type of message that provides updated information concerning a predetermined "source", and is identifiable by a selective call radio as being associated with the predetermined source. An information message can be, and typically is, transmitted as a portion of a selective call message that includes a plurality of such information messages. As an example, a selective call message can include several updates of stock prices, each being associated with a source (a stock). A newly received information message from a particular source replaces an earlier received information message from the same particular source. In many instances the operator has paramount interest in the contents of all information messages associated with one or several of the sources. Information messages of one type, e.g., stock quotes, are typically displayed to a user as a group or list, and the list or group is commonly called a mail drop.

A known technique of displaying maildrop messages is to display them appended together as a group in a full screen manner, allowing the operator to scroll up and down through the group of messages by use of up and down button controls. When the operator is reading an information message of one type in a first group and wishes to read an information message of another type in another group, the operator scrolls to the maildrop header and then scrolls left or right to another maildrop. In some cases, such as the ADVISOR™ Graphix model pager, manufactured by Motorola, Inc. of Schaumburg, Ill., a short cut (called the "Quickview" feature) allows operator selection of one of the information messages for display in the full screen manner (in which up and down scrolling is permitted when the message exceeds the number of lines available on the screen).

It would be beneficial to be able to display the contents of the information messages of paramount interest without operator action beyond identifying the source or sources of paramount interest.

DETAILED DESCRIPTION OF THE PREFERRED EMBODIMENT

Figure 1:
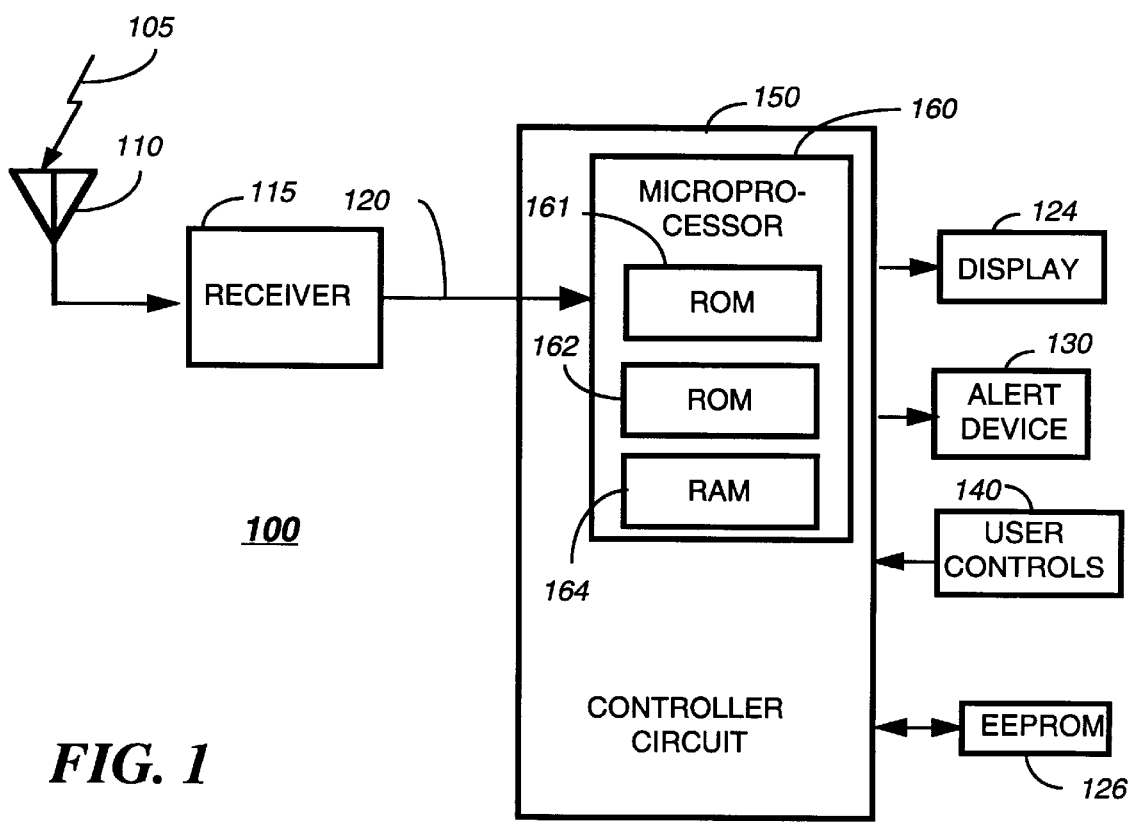
FIG. 1 is an electrical block diagram of a selective call receiver, in accordance with the preferred and alternative embodiments of the present invention.

Referring to FIG. 1, a block diagram of a selective call receiver 100 is shown, in accordance with the preferred embodiment of the present invention. The selective call receiver 100 is a selective call radio that comprises a conventional receiver section 115 and a controller circuit 150. A conventional antenna 110 intercepts radiated radio frequency (RF) signals 105 that are converted by the antenna 110 to conducted RF signals that are coupled to the receiver section 115. The receiver section 115 performs conventional receiving functions of filtering unwanted energy from the RF signal, converting the RF signal, and generating a demodulated signal 120 that is coupled to the controller circuit 150. The controller circuit 150 is coupled to a display 124, an alert 130, a set of user controls 140, and an electrically erasable read only memory (EEPROM) 126. The controller circuit 150 comprises a microprocessor 160, as well as other circuits not shown in FIG. 1, such as power regulation circuits.

The microprocessor 160 is coupled to the EEPROM 126 for storing an embedded address and other configuration information that is stored therein during a maintenance operation, and the microprocessor 160 loads the embedded address during normal operations of the selective call receiver 100. The microprocessor 160 is a digital signal processor of conventional circuit design, comprising a central processing unit (CPU) 161, a read only memory (ROM) 162, and a random access memory (RAM) 164.

A conventional message processor function of the microprocessor 160 decodes an outbound selective call message, generating data words that have been coded within an outbound signaling protocol conveyed by the radio signal 105, and processes an outbound selective call message when an address received in an address field of the outbound signaling protocol matches the embedded address stored in the EEPROM 126, in a manner well known to one of ordinary skill in the art for a selective call radio. An outbound selective call message that has been determined to be for the selective call receiver 100 by the address matching is processed by the message processor function according to the contents of the outbound message and according to modes set by manipulation of the set of user controls 140, in a conventional manner. An alert signal is typically generated when an outbound message includes user information. The alert signal is coupled to the alert device 130, which is typically either an audible or a silent alerting device.

When the outbound selective call message includes alphanumeric or graphic information, the information is displayed on the display 124 by a display function at a time determined by manipulation of the set of user controls 140. The outbound selective call message can include what are referred to herein as information messages, each having an identifiable source. Examples of information messages are a stock quote update, a baseball game score update, and a weather prediction for a predetermined location. Each of these has an identifiable "source". For example, the stock quote could be for Motorola, Inc. common shares, the baseball score could be for a Marlins-Cubs baseball game, and the weather prediction could be for Fort Lauderdale, Fla.

One or more information messages are received by the receiver section 115 in each selective call message. When the information messages have been received and decoded, they are filtered to determine those information messages from sources that the SCR does not accept. Those that are not acceptable are discarded. The remaining information messages are used to update a set of stored information messages that are stored in the RAM 104. "Updating" means that when an information message having a particular, acceptable source is already stored in the RAM 104, the latest received value of the information is stored in place of an earlier value stored.

In accordance with the preferred and alternative embodiments of the present invention, information messages are displayed in either a conventional manner or by using a function that is unique to the present invention. When the operator chooses the conventional manner, a maildrop list of information messages is displayed. The list is often much longer than the number of lines on the display screen (typically 4 to 10 for this type of SCR), so the operator uses up and down arrow keys to select a desired information message by viewing a first portion of each information message. When the operator finds an information message of interest, the operator places it at a predetermined line of the display, for example the last line, and manipulates the set of user control 140 to select it. The information is then displayed in a full screen manner. That is, a predetermined number of lines of the display are used to display as much of the text of the information message as possible, and the remaining portion, if any, is viewed by using the up and down arrow keys to scroll the message up and down. It will be appreciated that other conventional approaches can be used to select the desired information message, such as by using a cursor to identify it.

When the operator chooses to use the unique function, the operator selects one of the information messages as described above and manipulates the set of user controls 140, from which the controller 150 identifies a paramount source associated with the message. This can be repeated for several different information sources.

The display part of the function is performed in a manner unique to the present invention. In accordance with the preferred embodiment of the present invention, when an update to the stored information message associated with any of the identified paramount sources is received that changes the value of the stored information from a previously displayed value, the information message is then automatically displayed on a display line determined by a manipulation of the set of user controls 140 or predetermined by configuration information stored in the EEPROM 126, in a ticker-tape, or horizontal scrolling manner. "Automatically" means that the display is turned on if it is off and the scrolling is started. When more than one such paramount source is identified within a mail-drop, then whenever any information message within the mail drop is updated with a changed value, all such information messages associated with sources of paramount importance of the same type are automatically displayed, in a serial, horizontal scrolling manner (each such message appended together in a "loop" of such messages). Preferably, the alert is also activated. Preferably, the scrolling is performed for a predetermined time and then the display is shut down to preserve battery energy.

In accordance with an alternative embodiment of the present invention, whenever any information message associated with a paramount source is received (irrespective of whether a value different than that previously displayed is received), the information message(s) are displayed in the serial, horizontal scrolling manner.

Figure 2:
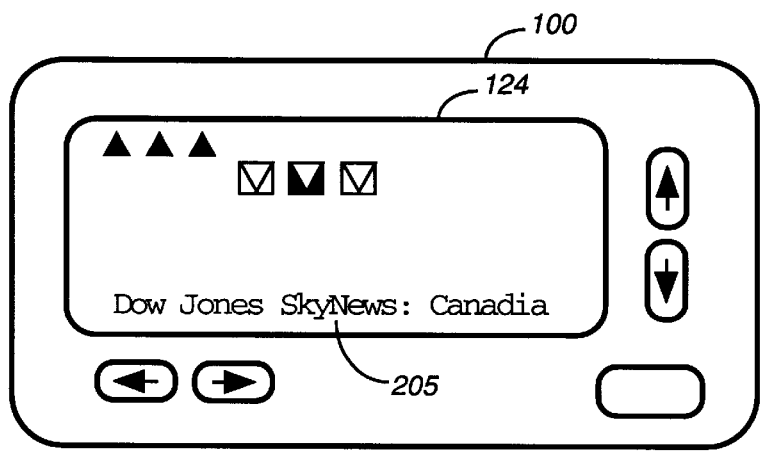
FIGS. 2, 3 and 4 are illustrations of the front of a selective call receiver, in accordance with the preferred and alternative embodiments of the present invention.
Figure 3:
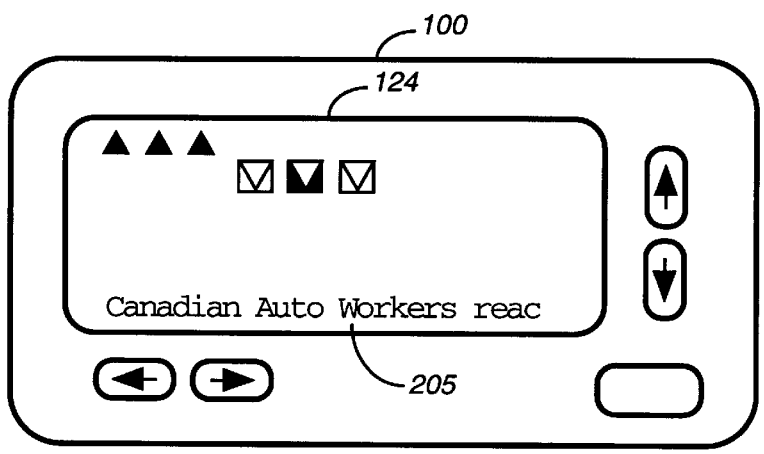
Figure 4:
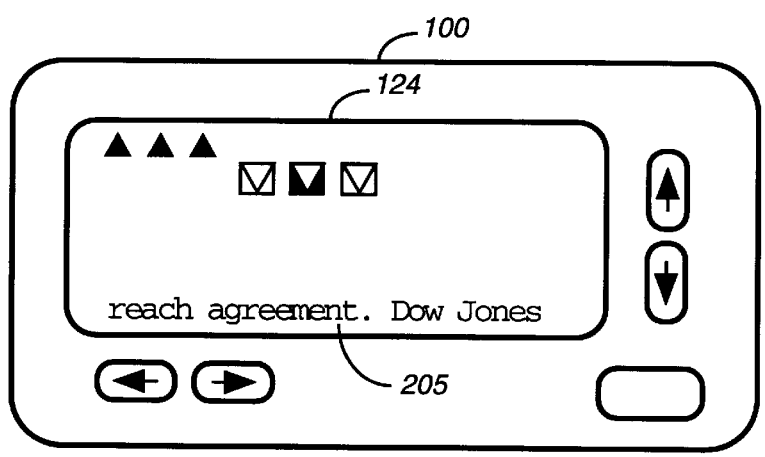

In FIGS. 2, 3 and 4, an illustration of the front of a selective call receiver 100 is shown, in accordance with the preferred and alternative embodiments of the present invention. In FIG. 2, an information message 205 in a maildrop named "Dow Jones SkyNews" has just been presented on the bottom line of the display 124. In FIG. 3 the information message has scrolled 19 characters to the left. This shifting occurs within a short period of time, for example, 2 seconds or less. The shifting will continue until at least the entire message or group of messages has shifted across the display. In FIG. 4, the message has scrolled another 25 characters to the left, and the name of the maildrop has looped around and is being displayed at the right of the display. When paramount sources of two or more maildrops are identified by the operator, additional lines can be pre-selected by manipulation of the set of user controls 140, one for each mail-drop (type).

Figure 5:
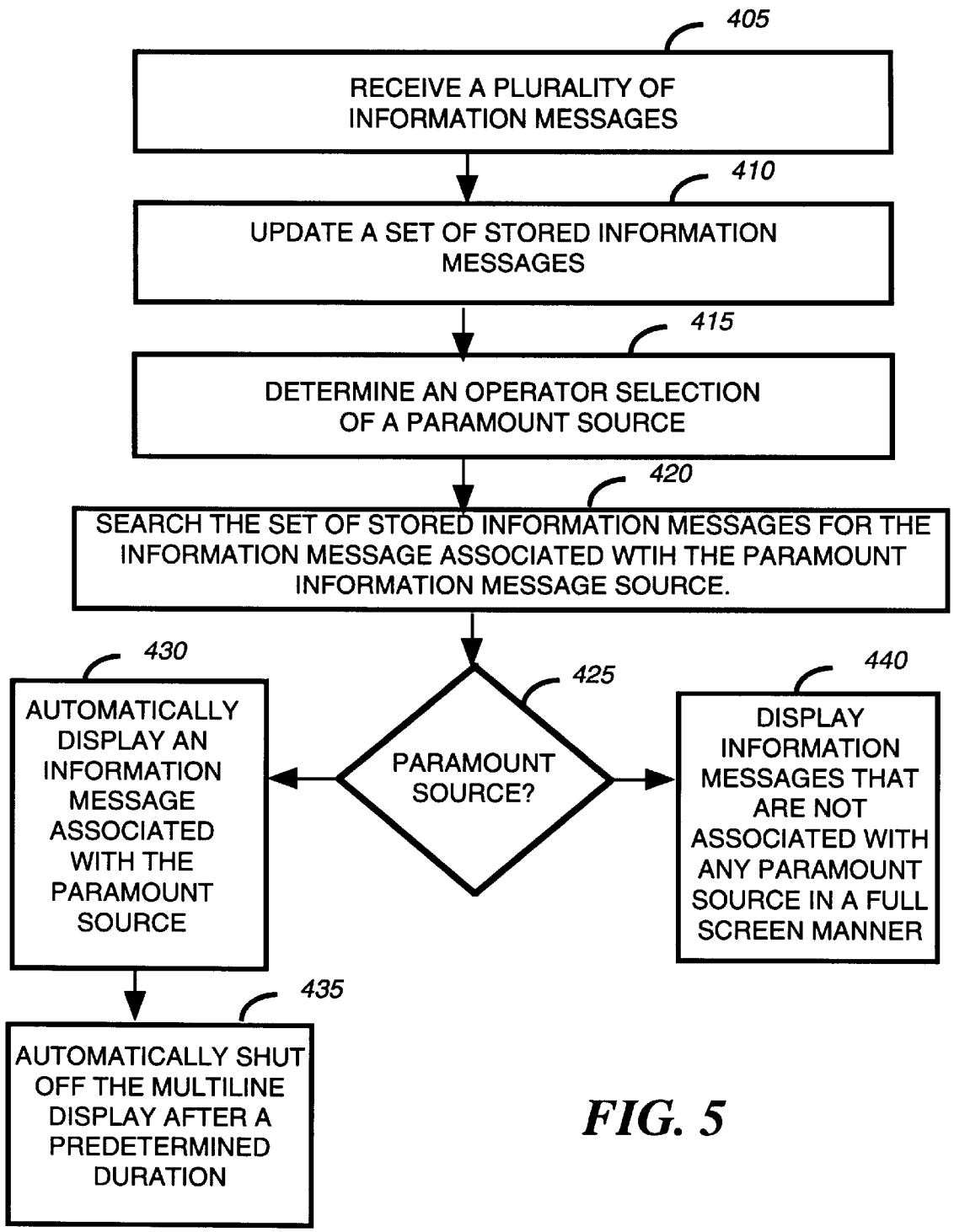
FIG. 5 is a flow chart of a method for displaying information messages received by the selective call receiver, in accordance with the preferred and alternative embodiments of the present invention.

Referring to FIG. 5, a flow chart of methods of displaying information messages are shown, in accordance with the preferred and alternative embodiments of the present invention. At step 405, a plurality of information messages is received by the SCR 100 in one or more selective call messages. Each of the plurality of information messages has an identifiable source. At step 410, a set of stored information messages is updated with each of the plurality of information messages received at step 405. At step 415, an operator selection of a paramount source is determined. This step is repeated when more than one paramount source is selected by the operator of the SCR 100. The set of stored information messages updated at step 410 is searched at step 420 for the information message associated with the paramount information message source selected at step 415. Step 420 is repeated when more than one paramount source has been selected at step 415.

At step 425, when an information message associated with any paramount source has been changed (i.e., determined to have a value different than a previously displayed value of an information message from the paramount source), in accordance with the preferred embodiment of the present invention, or when any paramount source is received (in accordance with the alternative embodiment of the present invention), then the information message associated with the paramount source is displayed, at step 430 in a horizontal scrolling manner. At step 435, the display is automatically shut off after a predetermined duration to save battery energy. When at step 425 no received (and stored) information messages are associated with paramount sources, then information messages are only displayed upon operator manipulation of the controls 140, at step 440, and they are displayed in a full screen manner.

It will be appreciated that a unique aspect of the present invention is the automatic presentation, without operator intervention, of one or more information messages that have been identified as being from a source of paramount importance, while other information messages require operator manipulation of controls to read. The invention can be used beneficially in virtually any selective call receiver that has a multiline display and receives information messages.

By now it should be appreciated that there has been provided a method of displaying information messages associated with predetermined sources on a multiline display of an SCR in a unique manner that prevents the operator of the SCR from having to manipulate any controls when the messages is received, thus improving the ease of use of the SCR.

What is claimed is:

1. A method used in a selective call receiver (SCR), for displaying information messages received by the SCR on a multiline display of the SCR, comprising the steps of:

receiving a plurality of information messages, wherein each of the plurality of information messages has an identifiable source;

determining an operator selection of a paramount source;

automatically displaying an information message associated with the paramount source on a line of the multiline display in a horizontal scrolling manner when the information message having the paramount source is determined to have a value different than a previously displayed value of an information message from the paramount source; and displaying information messages that are not associated with any paramount source in a full screen manner when such information messages are displayed in response to manipulation of controls.

2. The method according to claim 1, further comprising the steps of:

updating a set of stored information messages with each of the plurality of information messages; and searching the set of stored information messages for the information message associated with the paramount source.

3. The method according to claim 1, wherein when in the step of determining, a plurality of paramount sources of one type is determined, the information messages associated with each of the plurality of paramount sources are displayed in a serial, horizontal scrolling manner.

4. The method according to claim 1, further comprising the step of:

automatically shutting off the multiline display a predetermined duration after the step of automatically displaying an information message is begun.

5. A method used in a selective call receiver (SCR), for displaying information messages received by the SCR on a multiline display of the SCR, comprising the steps of:

receiving a plurality of information messages, wherein each information message has an identifiable source;

determining an operator selection of a paramount source;

automatically displaying an information message associated with the paramount source on a line of the multiline display in a horizontal scrolling manner when the information message having the paramount source is received; and displaying information messages that are not associated with any paramount source in a full screen manner when such information messages are displayed in response to manipulation of controls.

6. The method according to claim 5, further comprising the steps of:

updating a set of stored information messages with each of the plurality of information messages; and searching the set of stored information messages for the information message associated with the paramount source.

7. The method according to claim 5, wherein when in the step of determining, a plurality of paramount sources of one type is determined, the information messages associated with each of the plurality of paramount sources are displayed in a serial, horizontal scrolling manner.

8. The method according to claim 5, further comprising the step of:

automatically shutting off the multiline display a predetermined duration after the step of automatically displaying an information message is begun.

* * * * *